(12) United States Patent
Kumar et al.

(10) Patent No.: US 12,223,308 B2
(45) Date of Patent: Feb. 11, 2025

(54) METHODS AND APPARATUS TO PERFORM A PSEUDO-S3 PROTOCOL TO UPDATE FIRMWARE AND/OR ACTIVATE NEW FIRMWARE WITH A WARM RESET

(71) Applicant: Intel Corporation, Santa Clara, CA (US)

(72) Inventors: Mohan Kumar, Aloha, OR (US); Sarathy Jayakumar, Portland, OR (US); Brett Peng Wang, Shanghai (CN); Ashok Raj, Portland, OR (US); Murugasamy Nachimuthu, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 66 days.

(21) Appl. No.: 18/040,147

(22) PCT Filed: Aug. 25, 2020

(86) PCT No.: PCT/CN2020/111063
§ 371 (c)(1),
(2) Date: Jan. 31, 2023

(87) PCT Pub. No.: WO2022/040911
PCT Pub. Date: Mar. 3, 2022

(65) Prior Publication Data
US 2023/0305834 A1    Sep. 28, 2023

(51) Int. Cl.
*G06F 8/65*    (2018.01)
*G06F 8/654*    (2018.01)
(Continued)

(52) U.S. Cl.
CPC ............. *G06F 8/65* (2013.01); *G06F 9/4418* (2013.01); *G06F 9/4401* (2013.01); *G06F 9/4403* (2013.01); *G06F 9/4406* (2013.01)

(58) Field of Classification Search
CPC ........ G06F 8/65; G06F 9/4418; G06F 9/4403; G06F 9/4406; G06F 9/4401
See application file for complete search history.

(56) References Cited

U.S. PATENT DOCUMENTS

2009/0150662 A1* 6/2009 Desselle ................... G06F 8/65
713/100
2010/0095143 A1* 4/2010 Yamaji .................. G06F 9/4403
713/323
(Continued)

FOREIGN PATENT DOCUMENTS

CN    105068845 A    11/2015
CN    105808270 A    7/2016

OTHER PUBLICATIONS

Carlos Eduardo Tichy, Extreme Privilege Surveillance Inspecting BIOSes & OSes from SMM, May 16, 2017, [Retrieved on Aug. 14, 2024]. Retrieved from the internet: <URL: https://epub.technikum-wien.at/obvftwhsmmig/content/titleinfo/9753724/full.pdf> 149 Pages (1-149) (Year: 2017).*

(Continued)

*Primary Examiner* — Anibal Rivera
(74) *Attorney, Agent, or Firm* — HANLEY, FLIGHT & ZIMMERMAN, LLC

(57) ABSTRACT

Methods, apparatus, systems, and articles of manufacture to perform a pseudo-S3 protocol to update firmware and/or activate new firmware with a warm reset are disclosed. An example apparatus includes an advanced configuration and power interface (ACPI) to: initiate a pseudo-sleep event in response to identifying a firmware update; and assert a power button event, the power button event to cause an operating system (OS) to prepare to enter into a sleep state; a basic input/output system (BIOS) to: initiate a warm reset in response to the OS preparing to enter the sleep state, the
(Continued)

warm reset to update firmware according to the firmware update; and transmit a wake vector to the OS to continue operation.

20 Claims, 5 Drawing Sheets

(51) Int. Cl.
*G06F 8/656* (2018.01)
*G06F 9/4401* (2018.01)

(56) References Cited

U.S. PATENT DOCUMENTS

| | | | |
|---|---|---|---|
| 2015/0067365 A1* | 3/2015 | Nakazima | G06F 1/3265 713/320 |
| 2018/0165101 A1* | 6/2018 | Bulusu | G06F 11/1438 |
| 2019/0243637 A1 | 8/2019 | Nachimuthu | |
| 2020/0073652 A1 | 3/2020 | Chen | |
| 2020/0363857 A1* | 11/2020 | Kosugi | G06F 1/324 |

OTHER PUBLICATIONS

International Searching Authority, "Search Report and Written Opinion," issued in connection with Application No. PCT/CN2020/11063, mailed May 25, 2021, 8 pages.

International Searching Authority, "International Preliminary Report on Patentability," issued in connection with International Patent Application No. PCT/CN2020/111063, mailed on Feb. 28, 2023, 4 pages.

* cited by examiner

METHODS AND APPARATUS TO PERFORM A PSEUDO-S3 PROTOCOL TO UPDATE FIRMWARE AND/OR ACTIVATE NEW FIRMWARE WITH A WARM RESET

RELATED APPLICATION(S)

This patent arises from the national stage of International Application No. PCT/CN2020/111063, which was filed on Aug. 25, 2020. International Application No. PCT/CN2020/111063 is hereby incorporated herein by reference in its entirety. Priority to International Application No. PCT/CN2020/111063 is hereby claimed.

FIELD OF THE DISCLOSURE

This disclosure relates generally to computing systems, and, more particularly, to methods and apparatus to perform a pseudo-S3 protocol to update firmware and/or activate new firmware with a warm reset.

BACKGROUND

Electronic devices (e.g., computing devices, laptops, server platforms, etc.) are capable of operating in a sleep or low power mode. Such electronic devices may include an advanced configuration and power interface (ACPI) to perform power management tasks corresponding to low power modes. Some electronic devices are capable of operating in different sleeping states (e.g., S1, S2, S3, S4, etc.). As opposed to a complete shutdown, a sleep state retains the memory state of the electronic device so that a computer can conserve resources but wake back up quickly without the full reboot of a complete shutdown. In a S3 state, a processor of the electronic device is off and some hardware on the motherboard may also be off. During the S3 state, the central processing unit (CPU) and system cache context is lost. Control starts from the processor's reset vector after a wake event to wake up from the S3 state.

Figure 1:
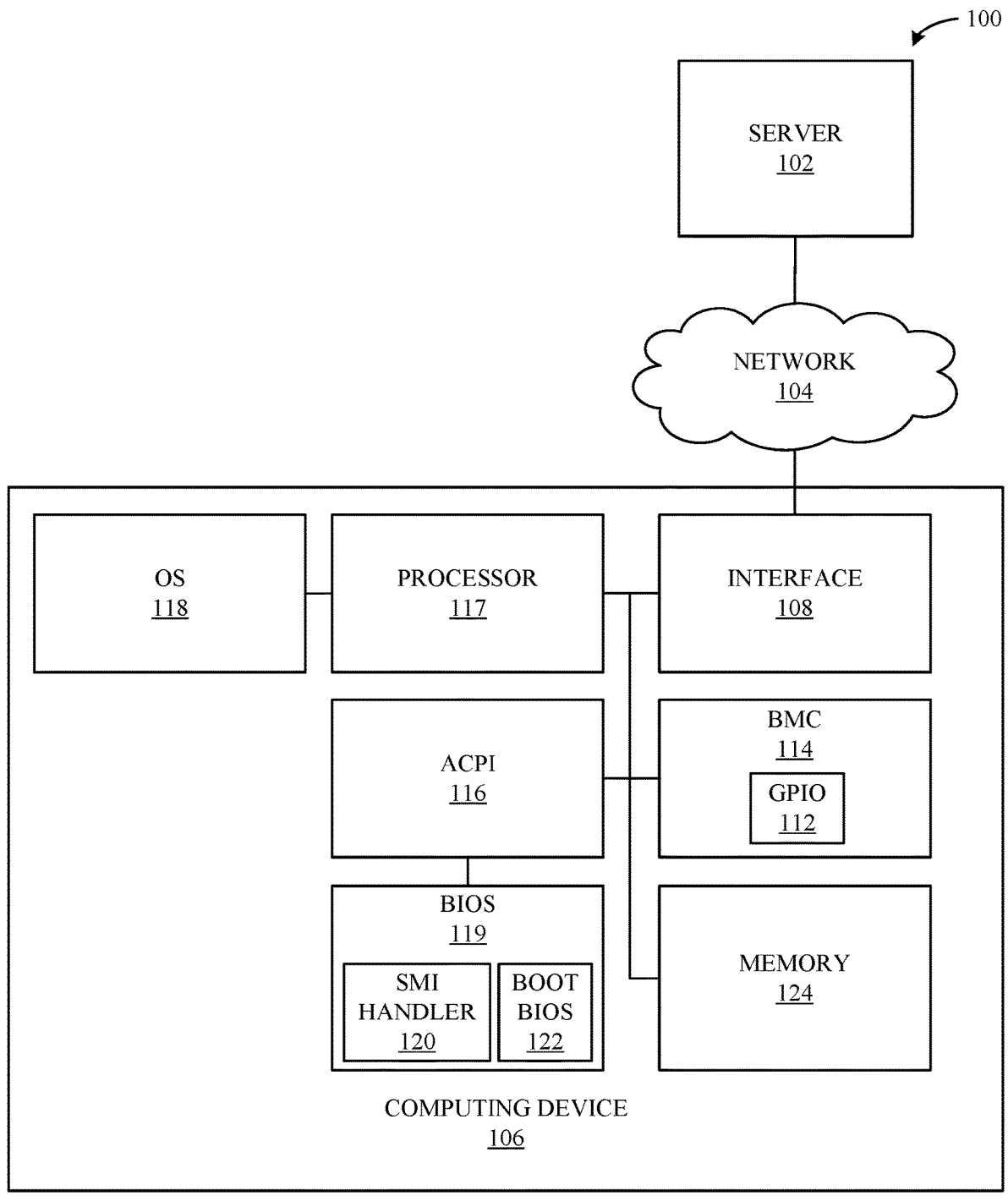
FIG. 1 illustrates an example environment for facilitating a warm reset to update firmware using a pseudo-S3 protocol in accordance with examples of this disclosure.

The figures are not to scale. In general, the same reference numbers will be used throughout the drawing(s) and accompanying written description to refer to the same or like parts. As used herein, connection references (e.g., attached, coupled, connected, and joined) are to be construed in light of the specification and, when pertinent, the surrounding claim language. Construction of connection references in the present application shall be consistent with the claim language and the context of the specification which describes the purpose for which various elements are connected. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Some entities (e.g., cloud service providers) provide services (e.g., compute-as-a-service (CaaS)) to computing devices of users (e.g., computers, laptops, servers, virtual machines, etc.). Initially, the entity may provide (e.g., deploy) software, instructions, commands, etc., that may be implemented at the computing device of a user. However, as the entity generates updated software, instructions, patches, etc., the entity may deploy updates to the computing devices to update the computing system.

Traditionally, when an update from an entity includes or is based on a firmware update (e.g., updating the configuration of firmware at the computing device), a computing device performs a full reboot to install the firmware update. During a full reboot, the operating system of the computing device shuts down and restarts all the processes and/or components of the computing device (e.g., including hardware drivers, kernels etc.) by interacting with the ACPI and/or the Basic Input/Output System (BIOS). The BIOS is firmware that performs hardware initialization during power up and/or booting the computing device. The ACPI is an interface layer between the system hardware and/or firmware and the operating system.

Although firmware updates may be vital to the performance and/or security of the computing device, a full boot causes the computing device to be inoperable and/or unusable for a few minutes. Such disruptions are undesirable. In some examples, such disruptions of service may violate a contract corresponding to a percentage of "ON" time and/or memory requirements. Additionally, a cloud service provider may require that computing devices (e.g., servers, virtual machines, etc.) keep memory intact. However, traditional firmware-based reboots may destroy the memory contents in violation of the requirement from the cloud service provider. Accordingly, to comply with the cloud server provider requirements, traditional firmware updating techniques include migrating workload and/or other information from the computing device to other nodes in a network of servers to be temporarily stored in the memory of the other nodes until the computing device reboots and can reload the remotely stored data. Accordingly, such traditional firmware updates are undesirable due to the time and resource consumption required to perform such traditional firmware updates.

Examples disclosed herein eliminate the need of a traditional full reboot to perform a firmware update at a computing device, thereby reducing the downtime and computing resources associated with traditional firmware updates. Examples disclosed herein eliminate the traditional reboot by leveraging the S3 sleep state (also referred to as S3 state or S3) infrastructure of a computing system established in the operating systems (OS) (e.g., Windows, Linux, etc.). As used herein, S3 is a sleep state or power state of a computing device. Sleep states may include an S0 state (e.g., a wake state in which most components of a computer are fully powered), S1 state (e.g., a sleep state in which the CPU is stopped and the computer in standby mode), S2 state (e.g., the CPU is stopped, the computer is in standby mode, the CPU context and contents of the system cache are lost due to power loss of the processor), S3 state (e.g., data or context is saved in RAM, and hard drives, fans, etc. are shut down), S4 state (e.g., data or context is saved to disk, also known as hibernate), and S5 state (e.g., complete shutdown power state).

Examples disclosed herein trigger a pseudo-S3 protocol, which the OS interprets or detects as an S3 protocol (e.g., the OS 'thinks' that a S3 protocol is being implemented). In this manner, the OS pauses the drivers, keeps the memory intact, keeps the stack pointers intact (e.g., by storing in memory), etc. While in the OS interprets the pseudo-S3 protocol as if the S3 protocol is being performed, examples disclosed herein perform a pseudo-S3 protocol instead of entering the sleep date or performing a full reboot by performing a warm reset to update firmware without destroying the physical memory content, and ensuring that the memory related configurations (e.g., stack pointer, OS operations, etc.) are not changed. In this manner, upon pseudo-S3 resume (e.g., returning from a pseudo-S3 state), the OS continues operation based on the location of the stack pointer (e.g., kept prior to entering the pseudo-S3 state) with updated firmware without performing a full reboot. Using examples disclosed herein, the system utilizes sleep states to perform a firmware update without actually entering into a sleep state or performing a warm reset or full reboot.

FIG. 1 illustrates an environment 100 to deploy and implement a firmware update at an example computing device 106 without performing a full reboot. The example environment 100 includes an example server 102, an example network 104, and the example computing device 106. The example computing device 106 includes an example interface 108, an example general-purpose input/output (GPIO) 112, an example baseboard management controller (BMC) 114, an example advanced configuration and power interface (ACPI) 116, an example processor 117 in communication with an example operating system (OS) 118, an example BIOS 119 including an example BIOS system management interrupt (SMI) handler 120 and an example boot BIOS 122, and an example memory 124.

The example server 102 of FIG. 1 is a computing device that deploys updates (e.g., software updates, firmware updates, etc.) to the example computing device 106 via the example network 104. For example, an entity utilizes the server 102 to transmit developed updates to the computing device 106 periodically, aperiodically, and/or based on a trigger (e.g., when an update is available). The example server 102 may generate the update and/or may obtain the update from another device (e.g., developed by a developer).

The example network 104 of FIG. 1 is a system of interconnected systems exchanging data between the server 102 and computing devices (e.g., including the computing device 106). The example network 104 may be implemented using any type of public or private network such as, but not limited to, the Internet, a telephone network, a local area network (LAN), a cable network, and/or a wireless network.

To enable communication via the network 104, the example server 102 and/or the computing device 106 includes a communication interface that enables a connection to an Ethernet, a digital subscriber line (DSL), a telephone line, a coaxial cable, or any wireless connection, etc.

The example computing device 106 of FIG. 1 is a device that implements an operating system. The example computing device 106 may be a server, a virtual machine, a laptop, etc. The example computing device 106 includes an interface 108 to obtain updates (e.g., firmware updates) from the server 102 via the network 104 and provide the updates to the computing device 106. The interface 108 could be or include an input/output (I/O) interface (e.g., to interface with to the network 104, the memory 124, an accelerator, or any other I/O device). The firmware updates can include updates to firmware or firmware components in any component of the computing device 106 that includes firmware (e.g., the BMC 114, the ACPI 116, the processor 117, the example BIOS 119, a manageability engine, a solid state device, a network on chip, etc.).

The example GPIO pin 112 of FIG. 1 is a digital pin or a multi-pin of the BMC 114. However, the example GPIO pin 112 can be or can be included in a platform controller hub (PCH) or a processor uncore or a I/O controller register. The example GPIO pin 112 of the BMC 114, when level triggered, may be used to output a signal or voltage level (e.g., representative of a binary zero or a binary one) that initiates a pseudo-S3 event and/or firmware update. The example GPIO pin 112, when end triggered, may be used to trigger a pseudo-S3 event and/or firmware update when the pin changes from high to low or from low to high. In this manner, the BMC 114 can assert the GPIO pin 112 (e.g., by setting a zero or greater voltage level at the GPIO pin 112 to set the GPIO pin 112 to active) to initiate the pseudo-S3 protocol to update firmware in response to obtaining a firmware update via the interface 108. As further described below, the ACPI 116 monitors the GPIO pin 112 to determine when the BMC 114 has transmitted the signal to the GPIO pin 112, thereby determining that a pseudo-S3 event is to occur and performs operations to facilitate the pseudo-S3 event. In some examples, instead of using the GPIO pin 112 to initiate a pseudo S3 event, the OS 118 and/or some other management agent may inform the BIOS 119 of the pseudo-S3 event through an in-band message.

The example BMC 114 of FIG. 1 is a device that monitors the physical state of the computing device 106 using sensors (e.g., measuring internal characteristics such as fan speed, temperature, power-supply voltage, humidity, OS functions, communication parameters, etc.) and by communicating with a system administrator through an independent connection. The example BMC 114 can notify the administrator if any sensed characteristic varies outside of a predefined range. In some examples, the BMC 114 includes and/or is implemented by firmware. When the server 102 transmits a firmware update, the BMC 114 of FIG. 1 identifies that the update includes a firmware update and assert the GPIO pin 112 corresponding to a firmware update to set the GPIO pin 112 corresponding to the firmware update and/or pseudo-S3 event to active. In this manner, the example ACPI 116, which monitors the GPIO pin 112, can determine that the pseudo-S3 event is to occur.

The example ACPI 116 of FIG. 1 facilitates the identification and/or configuration of computer hardware components to perform power management (e.g., putting components to sleep, status monitoring, etc.). In some examples, the ACPI 116 includes and/or is implemented by firmware. The ACPI 116 monitors the GPIO pin 112. In response to the BMC 114 asserting the GPIO pin 112, the ACPI 116 determines that the obtained update is a firmware update because the GPIO pin 112 of the BMC 114 was asserted. The example ACPI 116 determines that because the GPIO pin 112 was asserted, a pseudo-S3 protocol should be initiated based on the asserted pin of the GPIO pin 112. In response to determining that the update is a firmware update, the example ACPI 116 conveys the initiation of a pseudo-S3 protocol to the BIOS SMI handler 120 using a flag (e.g., by setting a pseudo-S3 flag, changing the value in a dedicated register corresponding to pseudo-S3, utilizing a unified extensible firmware interface (UEFI) variable to identify the pseudo-S3 protocol, and/or using any other method of flagging a pseudo-S3 event to BIOS SMI handler 120). A UEFI variable stores data (e.g., non-volatile data) that can be shared between firmware and the OS 118. In this manner, the UEFI variable can share whether a flag is set or not based on the value of the UEFI variable. After setting the pseudo-S3 flag, the ACPI 116 asserts a power button event. A power button event occurs on the computing device 106 when the power button is pressed (e.g., to enter into a sleep state, exit from a sleep state, power down, and/or restart). Accordingly, the ACPI 116 asserts a power button event to initiate the OS 118 to prepare to enter into the sleep state (e.g., S3).

The example OS 118 of FIG. 1 is a software system managing the example processor 117 to manage hardware of the computing device 106, software resources, and/or provides servers for computer programs and/or applications. When the example OS 118 determines that the power button event occurred while the computing device 106 is powered on (e.g., in the S0 state), the OS 118 handles the power button event as a normal S3 event by executing the S3 protocol steps that trigger S3 flow. For example, the OS 118 writes a value corresponding to the S3 state to the sleep state resister (e.g., ACPI SLP_TYP). Accordingly, the example OS 118 handles the power button event as an S3 event (e.g., by performing the steps for the S3 protocol), when the event is actually a pseudo-S3 event corresponding to a warm reset and firmware updates (e.g., the OS 118 is unaware of the warm reset and/or that the firmware is being updated). In some examples, the OS 118 may be aware of the pseudo S3 event and may flag the pseudo S3 event to other components of the device. After the example OS 118 writes the value corresponding to the S3 state to the sleep state register, the OS 118 and/or firmware triggers a SMI. For example, firmware of the computing device 106 may be structured to trigger an SMI in response to the OS 118 writing to the sleep state register. The OS 118 may additionally prepare for the S3 sleep state by flushing processor cache or I/O cache, storing critical contents in the memory 124, setting up the wake vector, etc.

The example BIOS 119 of FIG. 1 is and/or includes firmware. The BIOS 119 includes the example SMI handler 120 to handle SMIs during runtime and the example boot BIOS 112 to perform handle warm resets during boots and/or reboots. The example BIOS SMI handler 120 is and/or includes firmware that performs tasks in response to a triggered SMI. When a SMI is triggered, the example OS 118 saves the current state of the processor (e.g., the processor current state) and switches to a separate operating environment for system management mode (SMM) code to run. System management mode is an operating environment that is used during a sleep state where each core of the computing device 106 starts executing from address space of the respective cores. The BIOS SMI hander 120 starts the execution of the separate operating environment. The example BIOS SMI handler 120 determines if the pseudo-S3 flag is set or not. If the pseudo-S3 flag is not set, the example BIOS SMI handler 120 performs a normal S3 protocol. If the pseudo-S3 flag is set, the example BIOS SMI handler 120 triggers a warm reset.

The example boot BIOS 122 of FIG. 1 is and/or includes firmware that receives the warm reset trigger from the BIOS SMI handler 120. In response to obtaining the reset trigger, the example boot BIOS 122 runs a normal warm reset flow. A warm reset (also referred to as a warm reboot a soft reset, or a soft reboot) includes closing current programs, including the OS 118, and reinitiating a boot sequence until the OS 118 and all startup programs are reloaded. Because the example OS 118 is operating in an S3 state and memory is not cleared during a warm boot, when the OS 118 is reloaded, the example OS 118 continues operation where it left off based on a warm up vector that corresponds to the position in the stack where the OS 118 left off. Thus, during a warm reset, the memory contents are preserved by the platform, the processor 117, and a memory controller of the computing device 106. A full reboot (as referred to as a cold reboot), on the other hand, completely resets the hardware (e.g., including the memory and/or the stack), reloads the operating system, performs computer self-test routine(s) (not performed during a warm boot), and the example OS 118 starts operation at the beginning of the stack because memory is cleared during a full reboot. During the warm-reset flow, the example boot BIOS 122 ensures that the boot BIOS 122 uses only BIOS-reserved area of the memory 124 for boot purposes and does not use the memory 124 that is not reserved for BIOS use only (e.g., to preserve the memory used by the OS 118). The allocation of the example memory 124 is preset and further illustrated below in conjunction with FIG. 4.

Before ending the warm reset and returning control to the example OS 118, the boot BIOS 122 of FIG. 1 checks the pseudo-S3 flag to see if the warm reset is due to a pseudo-S3 event or a non-pseudo-S3 event. For example, if the ACPI 116 set a pseudo-S3 flag in UEFI variable in a register to a value indicative of a pseudo-S3 event, the BIO 112 checks the value in the register to determine if the value corresponds to the pseudo-S3 event. Additionally, the boot BIOS 122 checks if any memory topology has changed. A memory topology may change due to a hot plug of memory, when the interleave configuration is changed, when memory partition settings are changed, etc. When the memory topology is changed compared to a previous boot, the memory/interleave is re-initialized and the contents of the OS 118 in memory 124 may be lost during the re-initialization process. If the example boot BIOS 122 determines that the pseudo-S3 flag was set (e.g., based on a value in a register), and the memory topology has not changed, the boot BIOS 122 hands off operation to (e.g., triggers a change in control to) the OS 118 using on a OS specified wake vector that identifies where the OS 118 left off in a stack. In this manner, the example OS 118 can read the wake vector and continue operation where it left off when the pseudo-S3 event was initiated (e.g., returning to a normal operating state (e.g., the S0 state)), thus a firmware update is performed without entering a sleep state and/or performing a full reboot. If the example boot BIOS 122 determines that the pseudo-S3 flag was not set (e.g., another flag was set) or the memory topology has changed, the boot BIOS 122 clears the flag and a normal initialization flow is performed (e.g., a normal initialization flow corresponding to a sleep state).

The example memory 124 of FIG. 1 is memory used to store instructions for the components of the computing device 106. The memory 124 may be any type of suitable memory. As described above, there may be predefined sections of the memory that are dedicated to different components. The allocation of the example memory 124 is further described below in conjunction with FIG. 4.

While an example manner of implementing the example computing device 106 is illustrated in FIG. 1, one or more of the elements, processes and/or devices illustrated in FIG. 1 may be combined, divided, re-arranged, omitted, eliminated, and/or implemented in any other way. Further, the example interface 108, the example GPIO pin 112, the example BMC 114, the example ACPI 116, the example processor 117, the example BIOS SMI handler 120, the example boot BIOS 122, and/or, more generally, the example computing device 106 of FIG. 1 may be implemented by hardware, software, firmware and/or any combination of hardware, software and/or firmware. Thus, for example, any of the example interface 108, the example GPIO pin 112, the example BMC 114, the example ACPI 116, the example processor 117, the example BIOS SMI handler 120, the example boot BIOS 122, and/or, more generally, the example computing device 106 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example interface 108, the example GPIO pin 112, the example BMC 114, the example ACPI 116, the example processor 117, the example BIOS SMI handler 120, the example boot BIOS 122, and/or, more generally, the example computing device 106 of FIG. 1 is/are hereby expressly defined to include a non-transitory computer readable storage device or storage disk such as a memory, a digital versatile disk (DVD), a compact disk (CD), a Blu-ray disk, etc. including the software and/or firmware. Further still, example computing device 106 of FIG. 1 may include one or more elements, processes and/or devices in addition to, or instead of, those illustrated in FIG. 1, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 2A:
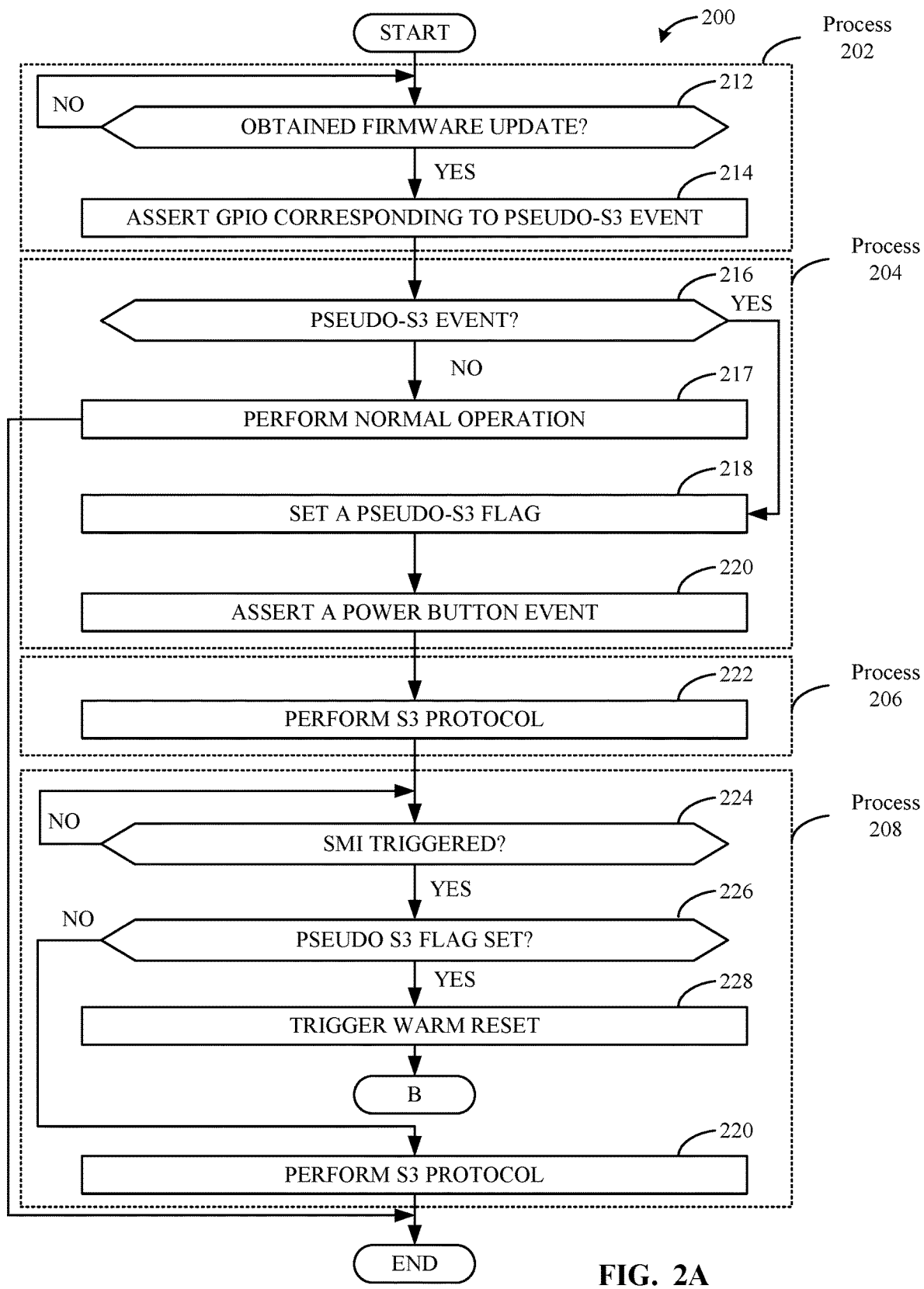
FIGS. 2A-2B illustrate a flowchart representative of example machine readable instructions which may be executed to implement the computing device of FIG. 1 to update firmware with a pseudo-S3 protocol.
Figure 2B:
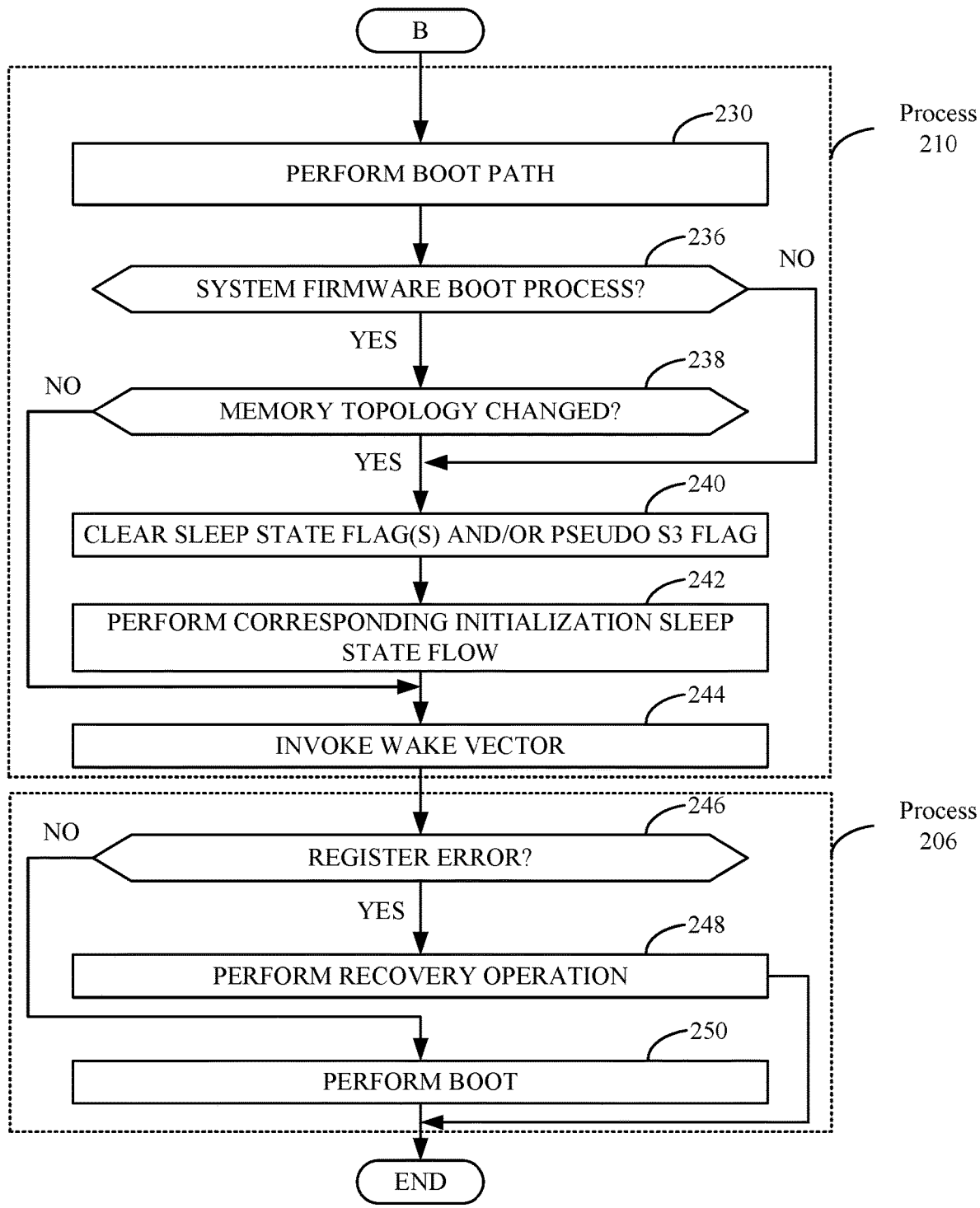

Flowcharts representative of example hardware logic, machine readable instructions, hardware implemented state machines, and/or any combination thereof for implementing the example computing device 106 of FIG. 1 are shown in FIGS. 2A-2B. The machine readable instructions may be one or more executable programs or portion(s) of an executable program for execution by a computer processor such as the processor 412 shown in the example processor platform 400 discussed below in connection with FIG. 4. The program may be embodied in software stored on a non-transitory computer readable storage medium such as a CD-ROM, a floppy disk, a hard drive, a DVD, a Blu-ray disk, or a memory associated with the processor 412, but the entire program and/or parts thereof could alternatively be executed by a device other than the processor 412 and/or embodied in firmware or dedicated hardware. Further, although the example program is described with reference to the flowcharts illustrated in FIGS. 2A-2B any other methods of implementing the example computing device 106 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example process of FIGS. 2A-2B may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIGS. 2A-2B illustrate an example flowchart representative of machine readable instructions 200 that may be executed to implement the example computing device 106 of FIG. 1 to perform a firmware update with a warm reset using a pseudo-S3 protocol instead of a full reboot. Although the instructions 200 are described in conjunction with the example computing device 106 of FIG. 1, the instructions 200 may be described in conjunction with any type of computing device.

The example flowchart of FIGS. 2A and 2B include multiple processes implemented by different components of the computing device. For example, the flowchart includes an example BMC process 202 implemented by the example BMC 114, an example ACPI process 204 implemented by the example ACPI 116, an example OS process 206 implemented by the OS 118, an example BIOS SMI handler process 208 implemented by the BIOS SMI handler 120, and an example boot bios process 210 implemented by the example boot BIOS 122. In other examples, the operations represented in FIGS. 2A and 2B may be implemented differently than shown.

At block 212, the example BMC 114 (FIG. 1) determines if a firmware update was obtained (e.g., received from the server 102 via the interface 108 of FIG. 1). As described above, the example server 102 may transmit a firmware update to the computing device 106 to update the firmware of the computing device 106 for any of a number of reasons (e.g., to increase the efficiency of the computing device, to increase the security of the computing device, etc.). If the example BMC 114 determines that a firmware update has not been obtained (block 212: NO), control returns to block 210 until a firmware update is received. If the example BMC 114 determines that a firmware update has been obtained (block 212: YES), the example BMC 114 asserts the GPIO pin 112 (FIG. 1) corresponding to the pseudo-S3 event (block 214).

At block 216, the example ACPI 116 (FIG. 1) determines if a pseudo-S3 event is initiated. For example, the ACPI 116 monitors the GPIO pin 112 to determine when the GPIO pin 112 has been set to active (e.g., asserted by the BMC 114). If the example ACPI 116 determines that a pseudo-S3 event has not been initiated (block 216: NO), the computing device 106 performs a normal operation corresponding to the event that has been triggered (e.g., if a normal S3 event was triggered, the computing device 106 performs a normal S3 protocol) (block 217). If the example ACPI 116 determines that a pseudo-S3 event has been initiated (block 216: YES), the example ACPI 116 sets a pseudo-S3 flag to identify the pseudo-S3 event to the BIOS SMI handler 120 (block 218). For example, the ACPI 116 may set a value in a register and/or set a value with a UEFI variable to represent the pseudo-S3 flag.

At block 220, the example ACPI 116 asserts a power button event (e.g., transmit a signal to the OS 118 indicative of a power button event). As described above, a power button event triggers the OS 118 to prepare to enter into a sleep state (e.g., S3 sleep state). At block 222, after the power button event is asserted, the example OS 118 performs the normal S3 protocol (e.g., to prepare to enter into the S3 sleep state). The normal S3 protocol includes writing a value to the sleep type register as an S3 event and triggering a SMI. As described above, although the pseudo-S3 protocol is being performed at the computing device 106, the OS 118 operates according to a normal S3 protocol and is unaware that the pseudo-S3 event is occurring. At block 224, the example BIOS SMI handler 120 determines if an SMI event has been triggered. If the example BIOS SMI handler 120 (FIG. 1) determines that an SMI event has not been triggered (block 224: NO), control returns to block 214 until the SMI has been triggered.

If the example BIOS SMI handler 120 determines that an SMI event has been triggered (block 224: YES), the BIOS SMI handler 120 checks the pseudo-S3 flag to determine if the flag has been set to indicate that the SMI corresponds to a pseudo-S3 event (block 226). If the BIOS SMI handler 120 determines that the pseudo-S3 flag has not been set to indicate a pseudo-S3 event (block 226: NO), the computing device 106 performs a normal S3 protocol (block 220). If the BIOS SMI handler 120 determines that the pseudo-S3 flag has been set to indicate a pseudo-S3 event (block 226: YES), the example BIOS SMI handler 120 triggers a warm reset (block 228). As described above, during a warm reset, the memory contents are preserved by the platform, the processor 117, and a memory controller of the computing device 106. At block 230 of FIG. 2B, the example boot BIOS 122 (FIG. 1) performs a boot path (e.g., the flow or instructions executed to boot after a warm reset). In some examples, the boot path includes updating and/or utilizing data in a BIOS reserved area of memory. The BIOS reserved area is a predefined area of the memory 124 that is not used by the OS 118. During the boot path, the boot BIOS 112 may check the pseudo-S3 flag to determine whether a pseudo-S3 event should occur. During the boot path (e.g., if a pseudo-S3 event should occur), the boot BIOS 122 updates and/or replaces its own firmware and/or the firmware of other components of the computing device 106 according to the firmware update.

At block 236, the example boot BIOS 122 checks whether a system firmware boot process is to occur. In some examples, the boot BIOS 122 checks whether the system firmware boot process is to occur by checking the pseudo-S3 flag to determine whether the pseudo-S3 flag flow is being/has been implemented. In some examples, this step is performed at block 230. If the example boot BIOS 122 determines that the system firmware boot process is not to be performed (block 236: NO), control continues to block 240, as further described below. If the example boot BIOS 122 determines that the system firmware boot process is to be performed (block 236: YES), the boot BIOS 122 determines if the memory topology changed (block 238). The memory topology may change when memory interleave changes, memory failure is detected, new memory is inserted, etc. If the example boot BIOS 122 determines that the memory topology has not changed (block 238: NO), the example boot BIOS 122 invokes a wake vector (block 244). For example, the wake vector may be a location of the memory 124, where the BIOS 119 needs to jump to (e.g., change pointer to this location). The location is set by the OS 118 with S3 wake startup code. When the BIOS 119 jumps to the location, the OS 118 wake startup routine begins executing to continue operation. As described above, a wake vector informs the OS 118 to continue operation (e.g., return to the S0 state/wake state operation) and provides the OS 118 with the location in the stack where the OS 118 left off before the pseudo-S3 event occurred, so that the OS 118 can continue operation where it left off. In this manner, firmware can be updated while the OS 118 operates according to a sleep state protocol without the computing device 106 entering a sleep state or performing a full reboot.

If the example boot BIOS 122 determines that the memory topology has changed (block 238: YES), the example boot BIOS 122 clears any set sleep state flag(s) and/or the pseudo-S3 flag (e.g., resets any set and/or activated sleep state flags) (block 240). At block 242, the example boot BIOS 122 performs the corresponding initialization sleep state flow (e.g., boot path). For example, the boot BIOS 112 identifies which sleep state is being executed and performs the corresponding initialization instructions that correspond to a protocol for booting after the sleep state ends. At block 246, the OS 118 determines if a register error has occurred. For example, the OS 118 expects the configuration of the OS 118 to be the same as it was before the pseudo-S3 event occurred because the OS 118 is built on an assumption of how the hardware is configured. Accordingly, if the OS 118 identifies a configuration change in the registers compared to what the OS 118 expects, it is a register error that needs to be fixed.

If the OS 118 determines that a register error has occurred (block 246: YES), the OS 118 performs a recovery operation (block 248). For example, if the OS 118 is implementing Windows, the recovery operation may include triggering a kernel soft reboot (KSR). A KSR is a windows server software defined (WSSD)-validated reboot that restarts the stack that the OS 118 implements. The KSR shuts down the OS 118 and restarts updated OS code and configuration and/or rebuilds the stack, skipping firmware power on self-test, to fix the register errors (e.g., other components of the computing device 106 are not reset). If the OS 118 is implementing another type of OS, the OS 118 may perform a recovery operation corresponding to the OS type to recover lost data to restore the state of the OS 118. If the OS 118 determines that a register error has not occurred (block 246: NO), the OS 118 performs a normal boot process (e.g., waking from the S3 state and/or returning to normal operation) and resumes operation (block 250).

Figure 3:
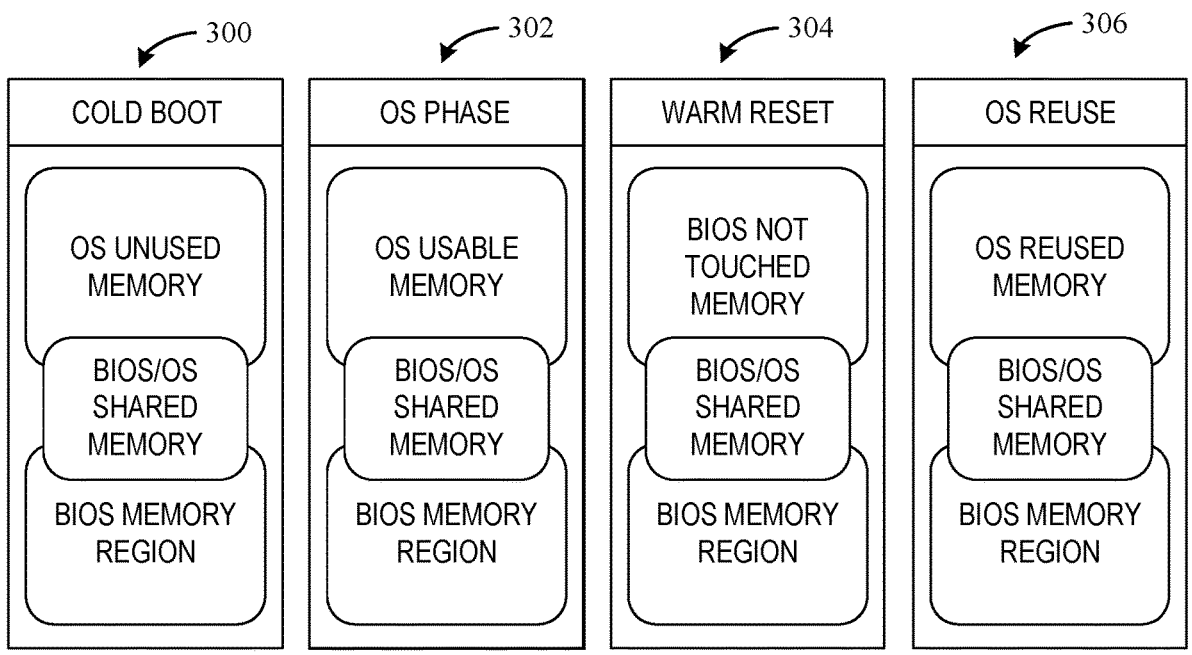
FIG. 3 illustrates memory preservation schemes for different phases of the computing device of FIG. 1.

FIG. 3 illustrates memory preservation schemes for the memory 124 of FIG. 1 corresponding to different phases of the computing device of FIG. 1. The example of FIG. 3 includes an example cold boot memory configuration 300, an example OS phase memory configuration 302, an example warm reset memory configuration 304, and an example OS reuse memory configuration 306.

In a full OS context saving scenario, the boot BIOS 122 preserves area(s) of the memory 124 so that the OS 118 will not utilize the preserved area(s). In this manner, the preserved areas of memory can be adjusted during a firmware update without affecting the OS 118, thereby allowing the OS to operate under S3 flow while a warm reset is performed. The areas may be based on the configuration of the computing device 106. The preserved areas may be dynamically adjustable with a predefined size. For example, if the memory capacity of the memory 124 changes, the allocation of the memory can also change. As shown in the example memory configurations 300, 302, 304, 306, a section of the memory 124 is reserved for boot BIOS 122, a section of the memory may be shared by the OS 118 and the boot BIOS 122, and a section of the memory is not used by the boot BIOS 122 and can be dedicated to the OS. In this manner, the OS can save all context through a well-established S3 flow in a section of the memory 124 not reserved for the boot BIOS 122, while the hardware and/or computing device 106 perform a warm reboot to update firmware. During the warm reboot, the boot BIOS 122 goes through the warm reset flow without destroying the memory content/map and/or critical registers corresponding to OS operation. In this manner, the OS 118 can be restored with a firmware update faster than a full reboot, thereby reducing the downtime associated with traditional firmware updates.

Figure 4:
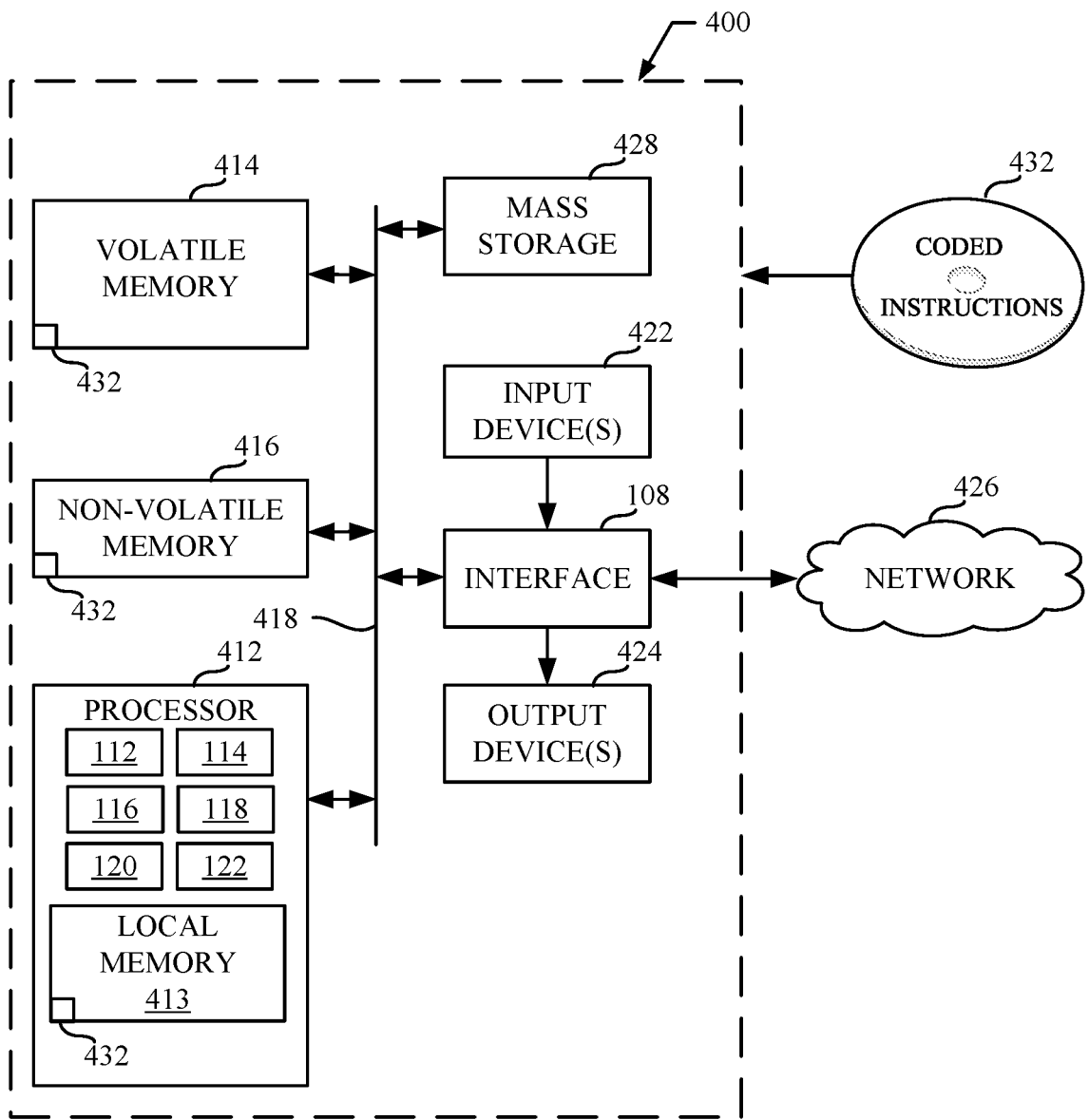
FIG. 4 is a block diagram of an example processing platform structured to execute the instructions of FIGS. 2A-2B to implement the example computing device of FIG. 1.

FIG. 4 is a block diagram of an example processor platform 400 structured to execute the instructions of FIGS. 2A-2B to implement the computing device 106 of FIG. 1. The processor platform 400 can be, for example, a server, a personal computer, a workstation, a web plugin tool, a self-learning machine (e.g., a neural network), a mobile device (e.g., a cell phone, a smart phone, a tablet such as an iPad™), an Internet appliance, or any other type of computing device.

The processor platform 400 of the illustrated example includes a processor 412 (e.g., which may implement the processor 117 of FIG. 1). The processor 412 of the illustrated example is hardware. For example, the processor 412 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 412 implements the example GPIO pin 112, the example BMC 114, the example ACPI, the example OS 118, the example BIOS SMI handler 120, and the example boot BIOS 122 of FIG. 1.

The processor 412 of the illustrated example includes a local memory 413 (e.g., a cache). The processor 412 of the illustrated example is in communication with a main memory including a volatile memory 414 and a non-volatile memory 416 via a bus 418. The volatile memory 414 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 416 may be implemented by flash memory and/or any other desired type of memory device. Access to the main memory 414, 416 is controlled by a memory controller. The example local memory 412, the example volatile memory 414, and/or the example non-volatile memory 416 may implement the example memory 124 of FIG. 1.

The processor platform 400 of the illustrated example also includes an interface circuit 108. The interface circuit 108 may be implemented by any type of interface standard, such as an Ethernet interface, a universal serial bus (USB), a Bluetooth® interface, a near field communication (NFC) interface, and/or a PCI express interface.

In the illustrated example, one or more input devices 422 are connected to the interface circuit 108. The input device(s) 422 permit(s) a user to enter data and/or commands into the processor 412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 424 are also connected to the interface circuit 108 of the illustrated example. The output devices 424 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 108 of the illustrated example, thus, typically includes a graphics driver card, a graphics driver chip, and/or a graphics driver processor.

The interface circuit 108 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 426. The communication can be via, for example, an Ethernet connection, a digital subscriber line (DSL) connection, a telephone line connection, a coaxial cable system, a satellite system, a line-of-site wireless system, a cellular telephone system, etc.

The processor platform 400 of the illustrated example also includes one or more mass storage devices 428 for storing software and/or data. Examples of such mass storage devices 428 include floppy disk drives, hard drive disks, compact disk drives, Blu-ray disk drives, redundant array of independent disks (RAID) systems, and digital versatile disk (DVD) drives.

The machine executable instructions 432 of FIGS. 2A-2B may be stored in the mass storage device 428, in the volatile memory 414, in the non-volatile memory 416, and/or on a removable non-transitory computer readable storage medium such as a CD or DVD.

From the foregoing, it will be appreciated that example methods, apparatus and articles of manufacture have been disclosed to perform a pseudo-S3 protocol to update firmware and/or activate new firmware with a warm reset. Example methods, apparatus and articles of manufacture reduce the amount of downtime of a computing device when firmware is to be updated by performing triggering allowing the OS to perform S3 flow while the computing device performs a warm reset to update firmware. In this manner, firmware can be updated without a full reboot. Accordingly, example methods, apparatus and articles of manufacture disclosed herein are directed to one or more improvement(s) in the functioning of a computing system.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Example methods, apparatus, systems, and articles of manufacture to perform a pseudo-S3 protocol to update firmware and/or activate new firmware with a warm reset are disclosed herein. Further examples and combinations thereof include the following: Example 1 includes an apparatus comprising an advanced configuration and power interface (ACPI) to initiate a pseudo-sleep event in response to identifying a firmware update, and assert a power button event, an operating system (OS) to prepare to enter into a sleep state in response to the power button event, and a basic input/output system (BIOS) to initiate a warm reset in response to the OS preparing to enter the sleep state, the warm reset to update firmware according to the firmware update, and transmit a wake vector to the OS to continue operation.

Example 2 includes the apparatus of example 1, further including a baseboard management controller (BMC) to set a general purpose input/output (GPIO) as active when the firmware update is obtained, the ACPI to identify the firmware update based on a status of the GPIO.

Example 3 includes the apparatus of example 1, wherein the OS is to trigger an interrupt when preparing to enter into the sleep state, further including an interrupt handler to in response to the interrupt, determine that the pseudo-sleep event was initiated, and trigger the BIOS to initiate the warm reset in response to the determination.

Example 4 includes the apparatus of example 1, wherein the OS is to return to operation after obtaining the wake vector.

Example 5 includes the apparatus of example 1, further including memory including a first section dedicated to the BIOS and a second section dedicated to the OS.

Example 6 includes the apparatus of example 5, wherein the BIOS is to update the firmware using the first section of the memory and keeping the second section of the memory intact.

Example 7 includes the apparatus of example 1, wherein the BIOS is to reset a second sleep state flag when at least one of (a) a pseudo-sleep flag is not set or (b) a memory topology has changed, the pseudo-sleep flag identifying that the pseudo-sleep event was initiated.

Example 8 includes the apparatus of example 1, wherein the firmware for at least one of BMC, the ACPI, the BIOS, a processor, a manageability engine, a solid state device, or a network-on-chip.

Example 9 includes a non-transitory computer readable storage medium comprising instructions which, when executed, cause a basic input/output system (BIOS) to at least in response to (a) a pseudo-sleep event being initiated and (b) an operating system preparing for a sleep state, initiate a warm reset to update firmware according to a firmware update, and transmit a wake vector to the operating system after the firmware is updated.

Example 10 includes the non-transitory computer readable storage medium of example 9, wherein the instructions are to cause the BIOS to update the firmware using a first section of memory dedicated to the BIOS and keeping a second section of the memory intact, the second section of memory dedicated to the operating system.

Example 11 includes the non-transitory computer readable storage medium of example 9, wherein the instructions are to cause the BIOS to reset a second sleep state flag when at least one of (a) a pseudo-sleep flag is not set or (b) a memory topology has changed, the pseudo-sleep flag identifying that the pseudo-sleep event was initiated.

Example 12 includes the non-transitory computer readable storage medium of example 9, wherein the firmware for at least one of a BMC, an ACPI, the BIOS, a processor, a manageability engine, a solid state device, or a network-on-chip.

Example 13 includes the non-transitory computer readable storage medium of example 9, wherein the instructions are to cause the BIOS to determine that the pseudo-sleep event is initiated based on a flag, and determine that the operating system is preparing to enter the sleep state based on the operating system triggering an interrupt.

Example 14 includes an apparatus comprising means for, in response to (a) a pseudo-sleep event being initiated and (b) an operating system preparing to enter a sleep state, initiating a warm reset to update firmware according to a firmware update, and means for waking up the operating system with a wake vector after the firmware is updated.

Example 15 includes the apparatus of example 14, further including means for storing data, the storing means including a first section dedicated to a BIOS and a second section dedicated to the operating system.

Example 16 includes the apparatus of example 15, wherein the waking means is to update the firmware using the first section of the storing means and keeping the second section of the storing means intact.

Example 17 includes the apparatus of example 14, wherein the waking means is to reset a second sleep state flag when at least one of (a) a pseudo-sleep flag is not set or (b) a memory topology has changed, the pseudo-sleep flag identifying that the pseudo-sleep event was initiated.

Example 18 includes the apparatus of example 15, wherein the firmware for at least one of a BMC, an ACPI, a BIOS, a processor, a manageability engine, a solid state device, or a network-on-chip.

Example 19 includes the apparatus of example 14, wherein the initiating means is to determine that the pseudo-sleep event is initiated based on a flag, and determine that the operating system is preparing to enter the sleep state based on the operating system triggering an interrupt.

Example 20 includes the apparatus of example 14, wherein the sleep state is an S3 sleep state.

The following claims are hereby incorporated into this Detailed Description by this reference, with each claim standing on its own as a separate embodiment of the present disclosure.

What is claimed is:

1. An apparatus comprising:
   an advanced configuration and power interface (ACPI) to:
      initiate a pseudo-sleep event in response to identifying a firmware update; and
      assert a power button event, the power button event to cause an operating system (OS) to prepare to enter into a sleep state; and
   a basic input/output system (BIOS) to:
      initiate a warm reset in response to the OS preparing to enter the sleep state, the warm reset to update firmware according to the firmware update without entering the sleep state or performing a full reboot; and
      transmit a wake vector to the OS to continue operation.

2. The apparatus of claim 1, further including a baseboard management controller (BMC) to set a general purpose input/output (GPIO) as active when the firmware update is obtained, the ACPI to identify the firmware update based on a status of the GPIO.

3. The apparatus of claim 1, wherein the OS triggers an interrupt when preparing to enter into the sleep state, further including an interrupt handler to:
   in response to the interrupt, determine that the pseudo-sleep event was initiated; and
   trigger the BIOS to initiate the warm reset in response to the determination.

4. The apparatus of claim 1, wherein the wake vector causes the OS to return to operation.

5. The apparatus of claim 1, further including memory, the memory including a first section dedicated to the BIOS and a second section dedicated to the OS.

6. The apparatus of claim 5, wherein the BIOS is to update the firmware using the first section of the memory and keeping the second section of the memory intact.

7. The apparatus of claim 1, wherein the BIOS is to reset a second sleep state flag when at least one of (a) a pseudo-sleep flag is not set or (b) a memory topology has changed, the pseudo-sleep flag identifying that the pseudo-sleep event was initiated.

8. The apparatus of claim 1, wherein the firmware is implemented by at least one of BMC, the ACPI, the BIOS, a processor, a manageability engine, a solid state device, or a network-on-chip.

9. A non-transitory computer readable storage medium comprising instructions which, when executed, cause a basic input/output system (BIOS) to at least:
   in response to (a) a pseudo-sleep event being initiated and (b) an operating system preparing for a sleep state, initiate a warm reset to update firmware according to a firmware update without entering the sleep state or performing a full reboot; and
   transmit a wake vector to the operating system after the firmware is updated.

10. The non-transitory computer readable storage medium of claim 9, wherein the instructions are to cause the BIOS to update the firmware using a first section of memory dedicated to the BIOS and keeping a second section of the memory intact, the second section of memory dedicated to the operating system.

11. The non-transitory computer readable storage medium of claim 9, wherein the instructions are to cause the BIOS to reset a second sleep state flag when at least one of (a) a pseudo-sleep flag is not set or (b) a memory topology has changed, the pseudo-sleep flag identifying that the pseudo-sleep event was initiated.

12. The non-transitory computer readable storage medium of claim 9, wherein the firmware is implemented by at least one of a baseboard management controller (BMC), an advanced configuration and power interface (ACPI), the BIOS, a processor, a manageability engine, a solid state device, or a network-on-chip.

13. The non-transitory computer readable storage medium of claim 9, wherein the instructions are to cause the BIOS to:
   determine that the pseudo-sleep event is initiated based on a flag; and
   determine that the operating system is preparing to enter the sleep state based on the operating system triggering an interrupt.

14. An apparatus comprising:
   means for, in response to (a) a pseudo-sleep event being initiated and (b) an operating system preparing to enter a sleep state, initiating a warm reset to update firmware according to a firmware update without entering the sleep state or performing a full reboot; and
   means for waking up the operating system with a wake vector after the firmware is updated.

15. The apparatus of claim 14, further including means for storing data, the storing means including a first section dedicated to a basic input/output system (BIOS) and a second section dedicated to the operating system.

16. The apparatus of claim 15, wherein the waking means is to update the firmware using the first section of the storing means and keeping the second section of the storing means intact.

17. The apparatus of claim 14, wherein the waking means is to reset a second sleep state flag when at least one of (a) a pseudo-sleep flag is not set or (b) a memory topology has changed, the pseudo-sleep flag identifying that the pseudo-sleep event was initiated.

18. The apparatus of claim 15, wherein the firmware is implemented by at least one of a baseboard management controller (BMC), an advanced configuration and power interface (ACPI), a BIOS, a processor, a manageability engine, a solid state device, or a network-on-chip.

19. The apparatus of claim 14, wherein the initiating means is to:
   determine that the pseudo-sleep event is initiated based on a flag; and
   determine that the operating system is preparing to enter the sleep state based on the operating system triggering an interrupt.

20. The apparatus of claim 14, wherein the sleep state is an S3 sleep state.

* * * * *